United States Patent Office 3,642,892
Patented Feb. 15, 1972

3,642,892
N,N-DIALLYL-3,4-DICHLOROBENZENE-
SULFONAMIDE
Joseph Willard Baker, Kirkwood, Mo., assignor to
Monsanto Company, St. Louis, Mo.
No Drawing. Filed Dec. 23, 1968, Ser. No. 786,390
Int. Cl. C07c 143/78
U.S. Cl. 260—556 AR                                    1 Claim

ABSTRACT OF THE DISCLOSURE

N,N-di(lower 2-alkenyl)benzenesulfonamides are described which are useful as herbicides.

This invention relates to a new class of benzenesulfonamides and more particularly to N,N-di(lower 2-alkenyl) benzenesulfonamides.

Various N,N,-di(lower alkyl)benzenesulfonamides have been reported. For example, Belgian Pat. No. 614,256 describes the insecticide 2,5-dichloro-N,N-diethylbenzenesulfonamide. The compounds of the present invention which are characterized by unsaturation in the nitrogen substituents are useful for destroying undesired vegetation. The new compounds may be represented by the formula

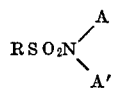

where R is trichlorophenyl, mono-chlorophenyl, dichlorophenyl, mono-nitrophenyl, tolyl, or xylyl, and A and A' are lower 2-alkenyl, preferably allyl but may be methylallyl, 2-butenyl, or other lower 2-alkenyl radicals. Chloro or bromo substituents may be present, for example 2-chloroallyl, 2 bromoallyl, 2,3-dichloroallyl, 2,3-dibromoallyl, 2,3,3-trichloroallyl, 2,3,3-tribromoallyl, 3-chloroallyl, 3-bromoallyl, and 3-chloro-2-butenyl.

The following examples will illustrate the invention.

EXAMPLE 1

A mixture of 7.8 grams (0.08 mole) of diallylamine and 9.1 grams (0.09 mole) of triethylamine is dissolved in 50 cc. of benzene in a one-liter, three-necked flask equipped with a glass stirrer, and 19.7 grams (0.08 mole) of 2,5-dichlorobenzenesulfonyl chloride dissolved in 50 cc. of benzene poured into the amine solution. The reactants are stirred for an hour following which the triethylamine hydrochloride which forms is filtered and the benzene removed by stripping. N,N-diallyl-2,5-dichlorobenzenesulfonamide is obtained in 98% yield as a dark red liquid. Analysis gives 4.37% nitrogen and 9.80% sulfur compared to 4.56% nitrogen and 10.4% sufur calculated for $C_{12}H_{13}Cl_2NO_2S$. Substituting 0.09 mole of bis (2-chloroallylamine) for diallylamine in the foregoing procedure yields N,N-bis(2-chloroallyl)-2,5-dichlorobenzenesulfonamide.

EXAMPLE 2

In the procedure of Example 1, an equimolar proportion of 2,5-dimethylbenzenesulfonyl chloride is substituted for the 2,5-dichlorobenzenesulfonyl chloride. N,N-diallyl-2,5-dimethylbenzenesulfonamide is obtained in 92% yield as a red liquid. Analysis gives 5.15% nitrogen and 11.5% sulfur compared to 5.27% nitrogen and 12.0% sulfur calculated for $C_{14}H_{19}NO_2S$.

EXAMPLE 3

To a well-stirred dispersion of 19.4 grams (0.2 mole) of diallylamine in 100 ml. of 10% sodium hydroxide solution there is added continuously, with stirring, 49.1 grams (0.2 mole) of 3,4-dichlorobenzenesulfonyl chloride. The reaction mixture is then heated to 60° C. and stirred vigorously for one-half hour. The resulting oil is chilled in a Dry-Ice/acetone bath whereupon it solidifies. The yellow solid is collected by filtration, washed with water, and air-dried. N,N-diallyl - 3,4 - dichlorobenzenesulfonamide is obtained in 99% yield. Recrystallization from ethyl alcohol yields a white solid melting at about 290° C.

EXAMPLE 4

Substituting an equimolar proportion of p-nitrobenzenesulfonyl chloride for the 3,4-dichlorobenzenesulfonyl chloride in the procedure of Example 3 produces N,N-diallyl-p-nitrobenzenesulfonamide in 91% yield. After recrystallization from ethyl alcohol, the pale-yellow crystals melt at 62°–63° C. Analysis gives 8.97% nitrogen and 11.5% sulfur compared to 9.94% nitrogen and 11.3% sulfur calculated for $C_{12}H_{14}N_2O_4S$.

The compounds are herbicides which combine grass and broadleaf activity. They control two major midwest weedy grasses, crabgrass and barnyard grass. They also control one of the most prevalent broadleaf weed familes, pigweed.

Table I illustrates pre-emergent herbicidal activity. The toxicants are applied as aqueous sprays to germinating seedlings of various plant species. The active ingredient is emulsified in water and applied to seeded soil at the rates shown in the table. About fourteen days after application of the toxicants, results are observed and recorded. The number of seeds emerging is converted to weighted herbicidal ratings based on average percent germination of any particular seed lot times an injury factor. This evens irregularities of herbicide ratings of seeds which vary in percent germination. The injury factor takes into consideration any plants not expected to survive. Thus, phytotoxicity ratings are based on the number of plants which emerge and would survive as observed about two weeks after planting. Herbicidal ratings are assigned by means of the following conversion scale.

| Percent emergence: | Phytotoxicity rating |
|---|---|
| 0–25 | Severe. |
| 26–50 | Moderate. |
| 51–75 | Slight. |
| 76–100 | None. |

The phytotoxicities are recorded below:

TABLE I

| Active ingredient | lbs./acre | Results observed |
|---|---|---|
| N,N-diallyl-2,5-dichlorobenzenesulfonamide. | 25 | Severe phytotoxicity to barnyard grass, crabgrass, and pigweed. Tillering or other formative effects. |
| N,N-diallyl-2,5-dimethylbenzenesulfonamide. | 25 | Severe phytotoxicity to barnyard grass, crabgrass, pigweed, and sorghum; moderate phytotoxicity to wild oats, sugar beet, and wild buckwheat. |
| N,N-diallyl-3,4-dichlorobenzenesulfonamide | 5 | Severe phytotoxicity to barnyard grass, crabgrass, pigweed, sugar beet, and foxtail. Tillering or other formative effects. |

Use as foliage toxicants is demonstrated by applying the active ingredient as an aqueous spray of 0.5% concentration to the foliage of bean and other broadleaf plants. Severe phytotoxicity to beans is observed with N,N-diallyl-2,5-dimethylbenzenesulfonamide and moderate phytotoxicity with N,N-diallyl-2,5-dichlorobenzenesulfonamide and N,N-diallyl-3,4-dichlorobenzenesulfonamide. Moderate phytotoxicity to broadleaf plants is observed with N,N-diallyl-p-nitrobenzenesulfonamide.

It is intended to cover all changes and modifications of the examples of the invention herein chosen for purposes of disclosure which do not constitute departures from the spirit and scope of the invention. The matter contained in the following claim is to be read as part of the general description of the present invention.

What is claimed is:
1. N,N-diallyl-3,4-dichlorobenzenesulfonamide.

References Cited

UNITED STATES PATENTS 3,367,949  2/1968  Soper _____ 260—397.7

FOREIGN PATENTS

| 4,017,789 | 8/1965 | Japan | 260—556AR |
| 929,905 | 7/1947 | France | 260—556 AR |
| 1,320,028 | 1/1963 | France | 260—556 AR |

OTHER REFERENCES

Belgian Patent Report, vol. 91A, 1962, sec. 5, page 5, Belg. 614,256.

Belgium Recueil Des Brevets D'Invention, 1962, sec. A01n, page 236, Belg. 614,256.

HENRY R. JILES, Primary Examiner

S. D. WINTERS, Assistant Examiner

U.S. Cl. X.R.

71—103; 260—397.7 R, 556 B